United States Patent
Sollitto et al.

(12) 
(10) Patent No.: US 6,761,240 B1
(45) Date of Patent: Jul. 13, 2004

(54) ILLUMINATED MOTORCYCLE SHIFTER LINKAGE

(76) Inventors: Joseph F. Sollitto, 60 Westervelt Pl., Lodi, NJ (US) 07644; Robert Foglia, 10 Woodrow Ave., W. Patterson, NJ (US) 07424

( * ) Notice: Subject to any disclaimer, the term of this patent is extended or adjusted under 35 U.S.C. 154(b) by 0 days.

(21) Appl. No.: 10/145,801

(22) Filed: May 16, 2002

(51) Int. Cl.⁷ .................................................. B62K 11/10
(52) U.S. Cl. ........................................ 180/219; 362/473
(58) Field of Search ................ 180/219; 362/473–491, 362/540; 340/427, 425.5, 456, 691.1, 691.7, 691.8, 815

(56) References Cited

U.S. PATENT DOCUMENTS

| | | | |
|---|---|---|---|
| 3,355,581 A | 11/1967 | Fleming | 362/8.3 |
| 4,337,503 A * | 6/1982 | Turner | 362/474 |
| 4,797,791 A | 1/1989 | Burchick | 362/72 |
| 4,819,135 A * | 4/1989 | Padilla et al. | 362/473 |
| 5,025,351 A | 6/1991 | Martin | 362/83 |
| 5,455,747 A | 10/1995 | Aoyama | 362/61 |
| 5,490,049 A | 2/1996 | Montalan et al. | 362/240 |
| 5,546,290 A * | 8/1996 | Gonzalez et al. | 362/487 |
| 5,590,947 A | 1/1997 | Kidd, Jr. | 362/72 |
| 5,632,551 A | 5/1997 | Roney et al. | 362/249 |
| 5,634,706 A | 6/1997 | Barry | 362/72 |
| 6,053,626 A | 4/2000 | Zagrodnik et al. | 362/473 |
| 6,099,150 A | 8/2000 | Hsiao | 362/473 |
| 6,158,882 A * | 12/2000 | Bischoff, Jr. | 362/488 |
| 6,196,707 B1 | 3/2001 | Deckard | 362/473 |
| 6,203,181 B1 | 3/2001 | Gross | 362/486 |

* cited by examiner

*Primary Examiner*—Lesley D. Morris
*Assistant Examiner*—L. Lum
(74) *Attorney, Agent, or Firm*—Lawrence G. Fridman

(57) ABSTRACT

An illuminated shifter linkage apparatus for coupling the shifter pedal and the transmission of a motorcycle includes an inner rod having a plurality of light-emitting elements seated within a corresponding set of inner rod apertures, and an open-ended outer hollow shaft into which the inner rod is received. When fully assembled, the light-emitting elements align with the corresponding apertures in the outer hollow shaft to facilitate the passage of light through the shaft apertures, thereby providing an aesthetically pleasing appearance and enhancing the visibility of the motorcycle at night and in poorly lit areas.

23 Claims, 5 Drawing Sheets

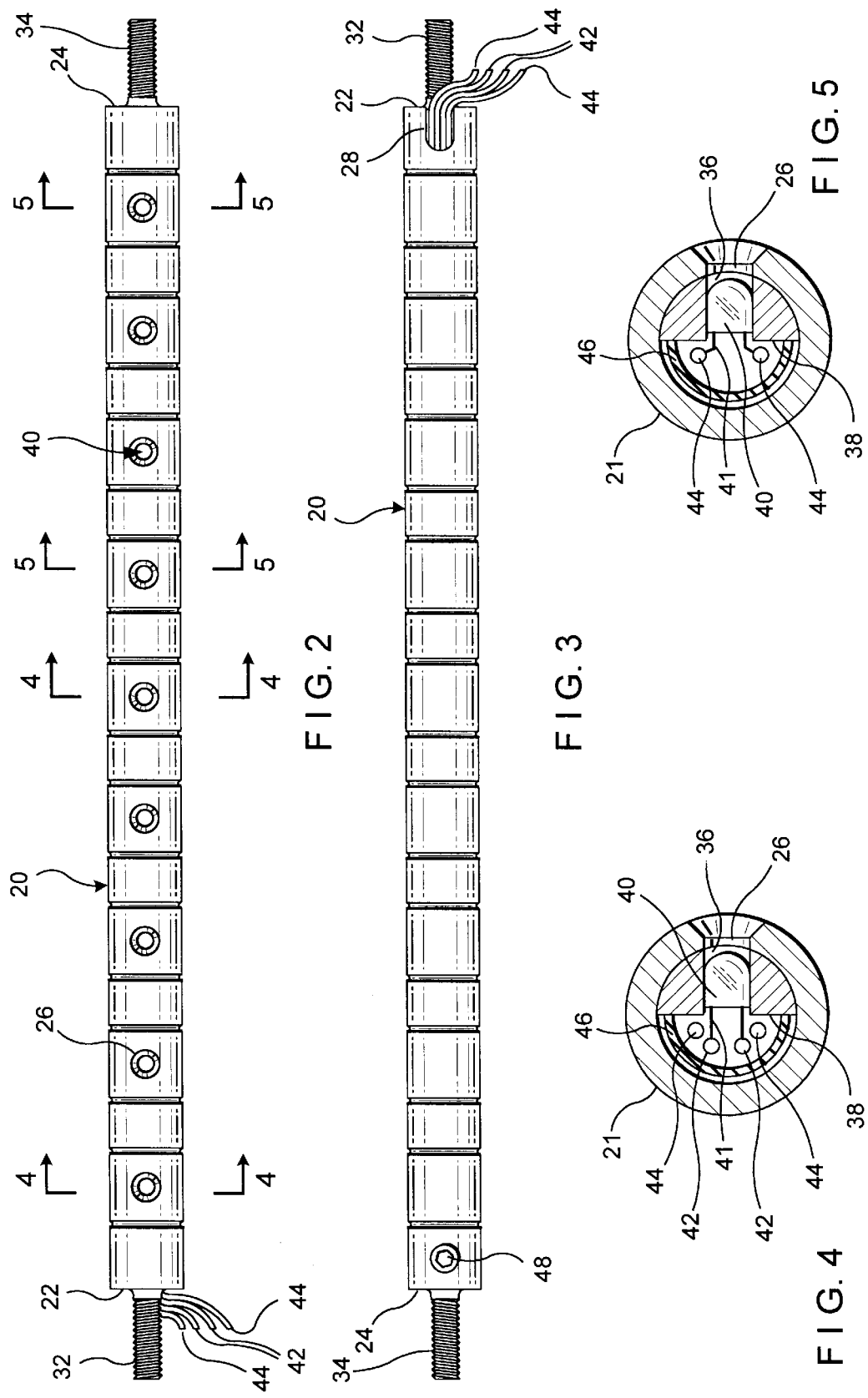

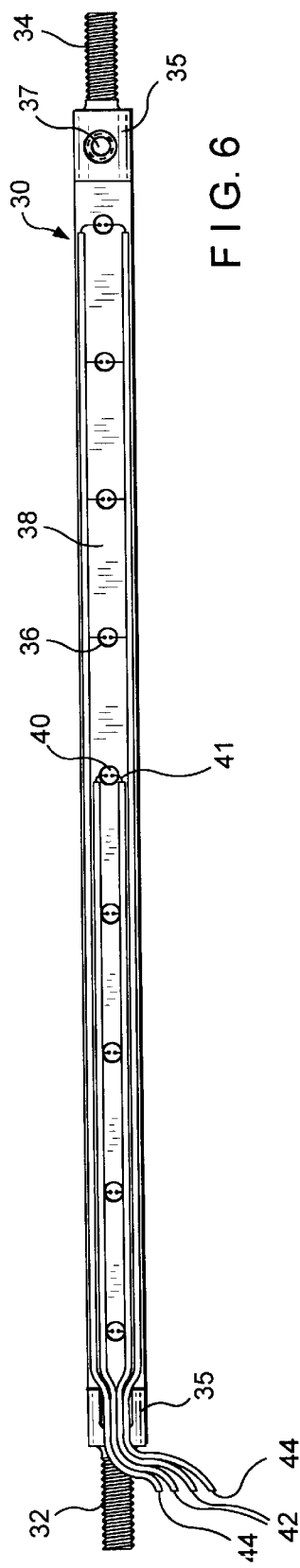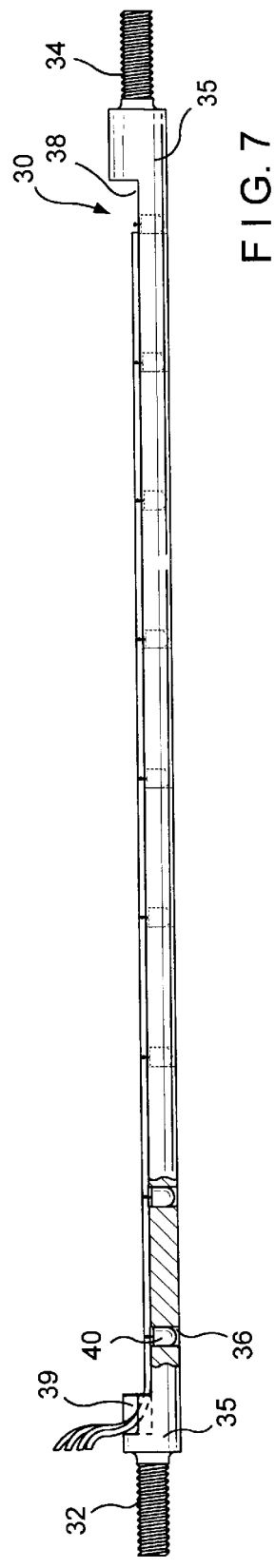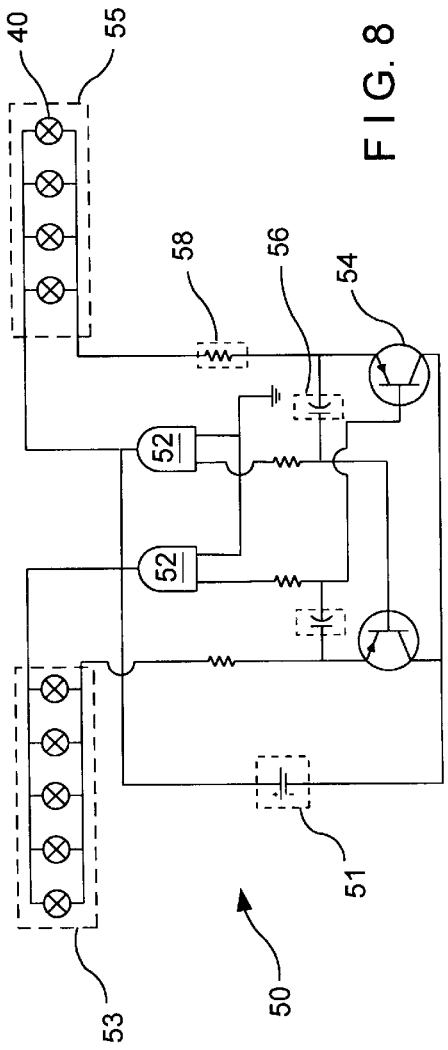

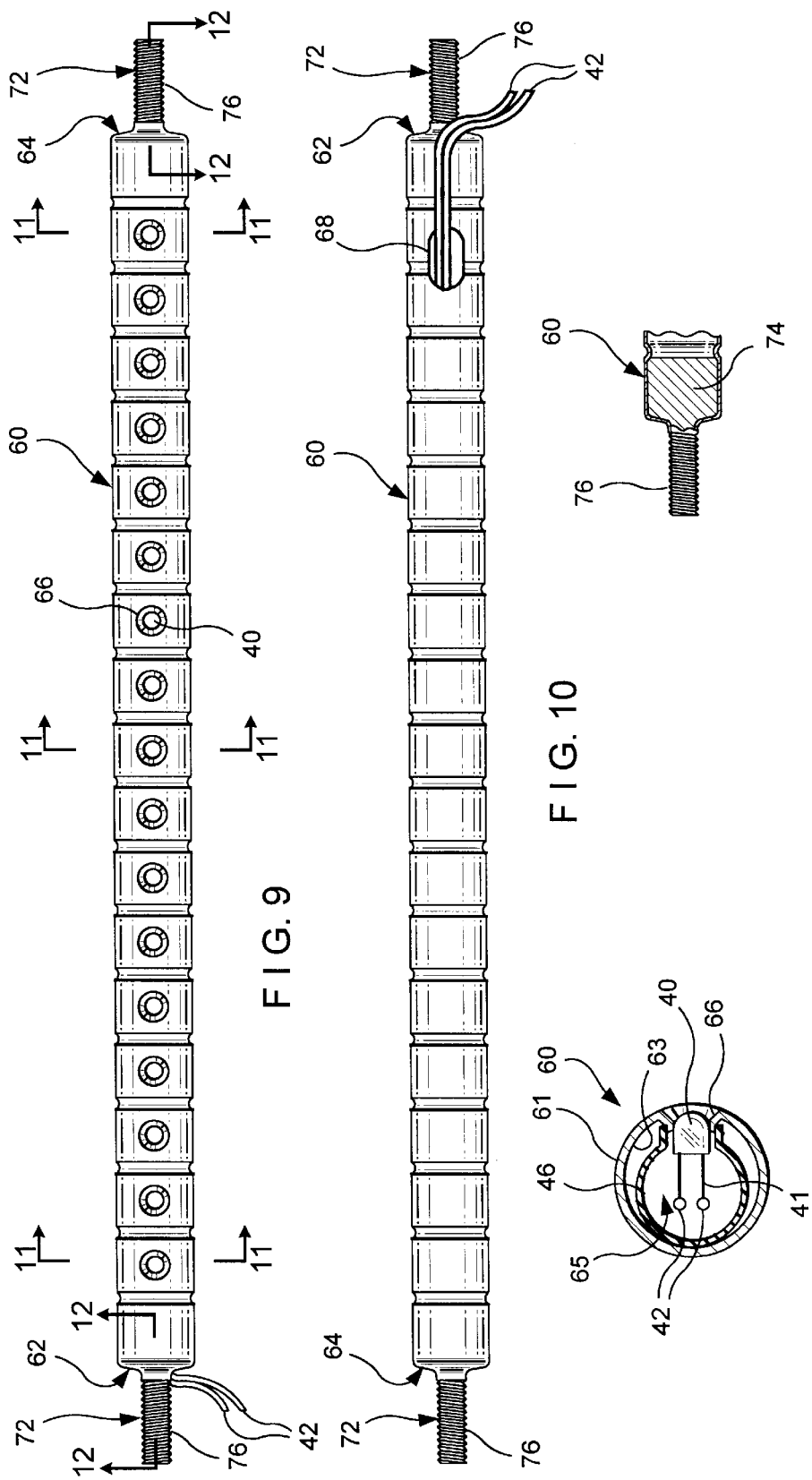

ILLUMINATED MOTORCYCLE SHIFTER LINKAGE

BACKGROUND OF THE INVENTION

1. Field of the Invention

The present invention relates generally to motorcycle shifter arms or linkages, and more particularly to an illuminated shifter linkage apparatus.

2. Description of the Prior Art

Motorcycle riders generally have a great concern with safety while riding their vehicles. Of particular concern is the lack of visibility of a rider's motorcycle at night and in poorly lit areas. For this reason, many motorcycle owners find to be desirable to incorporate auxiliary lighting. According to the prior art, one means of providing enhanced lighting is to attach additional lighting components to the existing motorcycle body. For example, U.S. Pat. No. 5,590,947 discloses an illuminated windscreen for a motorcycle fairing, incorporating a plurality of light bulbs adjacent a lower edge portion of the windscreen and attached by mechanical clips. While such auxiliary attachment may serve the purpose of improving visibility, many motorcycle owners would prefer to incorporate lighting into an existing feature of the motorcycle in a manner enhancing the aesthetic appearance of the vehicle. Such enhancements may also be desirable for distinguishing an owners motorcycle from his fellow riders' bikes. Where the lighting is to be incorporated into an existing structure, an important consideration is that the chosen structure has either limited or smooth movement during operation, thereby minimizing agitation of the lighting components.

Most conventional motorcycles have a toe shift pedal enabling the motorcycle operator to shift transmission gears via elevation or depression of the pedal by foot. In many conventional types of motorcycles, the shifter pedal and the transmission lever are separated by a distance and, therefore, require a shifter rod or linkage coupled at opposite ends to the shift pedal and transmission lever to enable gear shifting. In this manner, the pedal is used to shift transmission gears indirectly via back-and-forth movement of the shift rod.

The class of motorcycle that would typically need a shifter rod are so-called touring and cruiser classes which have the floor board or foot peg positioned forward to provide a better seating position for a longer comfortable ride. Typically, American-made motorcycles, such as Harley Davidson brand motorcycles, have a rear mounted transmission behind the engine housing. Consequently, they require such a shift linkage to connect the transmission via the linkage to the shifting pedal or lever. Likewise, Japanese motorcycles available in the cruiser or touring classes have the foot controls moved slightly forward and require such a shift linkage. Still other motorcycles having transmissions incorporated directly into the engine housing utilize a shifter linkage.

In operation, when the shifter pedal is pressed downwardly it causes the shifter lever downward, pulling the shifter linkage forward, which also pulls the lever on the transmission forward to put it into first gear. Subsequently, the rider can lift the pedal up one click, urging the lever backwards and putting the transmission into neutral. The rider can then successively lift the pedal, each time shifting up one gear. The shifter linkage is limited to smooth back-and-forth movement during operation and would therefore provide a desirable structural element in which to incorporate auxiliary lighting. Furthermore, the positioning of the shifter linkage along the side of the motorcycle makes it a desirable location for enhancing visibility of the motorcycle.

Accordingly, it would be desirable to provide a shift linkage apparatus incorporating illumination means for enhancing both the aesthetics and visibility of the motorcycle.

SUMMARY OF THE INVENTION

The invention is directed to a motorcycle shift linkage apparatus incorporating internal illumination means for enhancing the aesthetic appearance of the shift linkage as well as the visibility of the motorcycle at night and in poorly lit areas.

In one general aspect of the present invention, the illuminated shift linkage apparatus comprises a substantially rigid, longitudinally extending shaft having a hollowed portion defining an interior shaft space, and a light-emitting source disposed within the interior shaft space. Portions of the shaft wall have apertures or otherwise decorative cut regions provided therein for enabling transmission of the emitted light therethrough. Opposite ends of the shaft are configured for coupling to corresponding shift pedal and transmission of the motorcycle.

In another aspect of the invention, the illuminated shift linkage apparatus comprises a rigid open-ended substantially hollow shaft member having disposed therein a longitudinal base member supporting a plurality of light-emitting elements. The light-emitting elements are seated within spaced-apart base member apertures aligned with corresponding shaft member apertures to facilitate transmission of the emitted light therethrough.

In a further aspect of the invention, opposite ends of the base member beyond the open ends of the hollow shaft member and are adapted for coupling to corresponding shift pedal and transmission portions of the motorcycle.

In still another aspect of the invention an electronic circuit is provided electrically coupled to a power source and to the light-emitting source for controlling one or more output characteristics, such as controlling the intensity or rate of blinking of the light-emitting source.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which:

FIG. 2 is a top plan view of an illuminated shifter linkage apparatus in accordance with a preferred embodiment of the invention;

FIG. 3 is a bottom view of the illuminated shifter linkage apparatus of FIG. 2;

FIG. 4 is a cross-sectional view taken along cutting planes 4—4 in FIG. 2;

FIG. 5 is cross-sectional view taken along cutting planes 5—5 in FIG. 2;

FIG. 6 is a top plan view of the light supporting inner rod member portion of the illuminated shifter linkage of the invention;

FIG. 7 is side elevational view of the light supporting inner rod member of FIG. 6;

FIG. 8 is a schematic diagram of an electrical circuit useful for controlling the illumination-providing Light Emitting Diodes of the present invention;

FIG. 9 is a top plan view of an illuminated shifter rod linkage in accordance with an alternate embodiment of the invention;

FIG. 10 is a bottom view of the illuminated shifter rod linkage apparatus of FIG. 9;

FIG. 11 is a cross-sectional view taken along cutting plane 11—11 in FIG. 9; and FIG. 12 is a cross-sectional view taken along cutting plane 12—12 in FIG. 9.

DETAILED DESCRIPTION OF THE PREFERRED EMBODIMENTS

Shown throughout the figures, the present invention is generally directed to an illuminated shifter linkage apparatus for use with motorcycles. The illuminated shifter linkage provides an aesthetically pleasing appearance and enhances the visibility of the motorcycle at night and in poorly lit areas.

Figure 1:
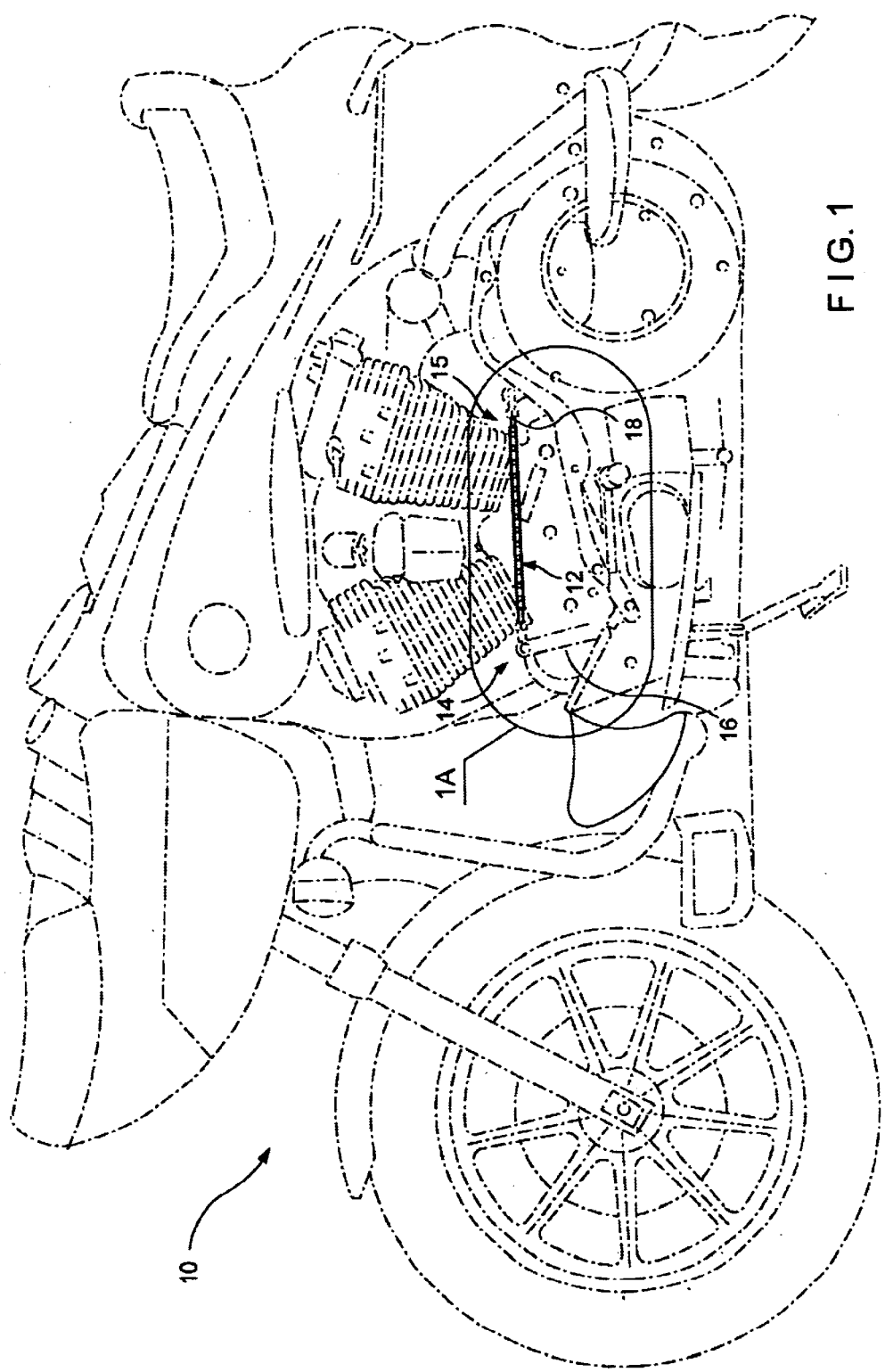
FIG. 1 is a schematic representation of a prior art motorcycle illustrating the relative positioning of the shifter linkage of the invention.
Figure 1A:
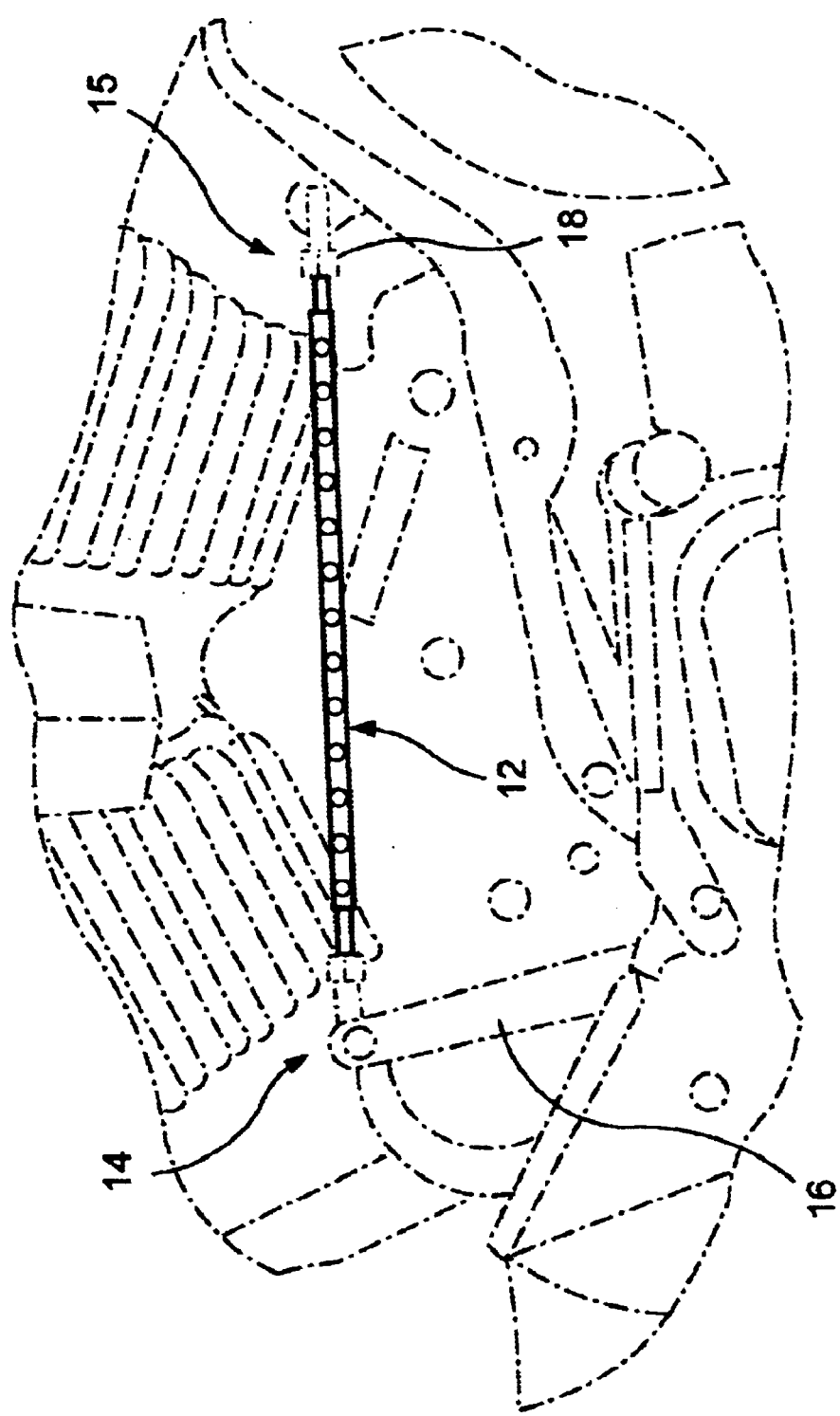
FIG. 1A is an enlarged fragment of the prior art motorcycle shown in FIG. 1.

Referring briefly to FIG. 1, the positioning of the illuminated shifter linkage 12 on a conventional motorcycle 10 is illustrated. The shifter linkage is coupled at a forward end 14 to a toe shifter pedal 16, and at a rearward end 15 to a transmission lever 18.

Referring now to FIGS. 2–7, a preferred embodiment of the illuminated shifter linkage apparatus of the present invention generally includes an outer cylindrical shaft member 20, an inner base member 30, a light-emitting source 40, and electrically conductive means 42, 44 for coupling the light-emitting source 40 to a power supply 58 (shown schematically in FIG. 8).

Cylindrical shaft member 20 is generally defined by a longitudinally-extending substantially hollow shaft having open forward and rearward ends, 22 and 24, respectively, and a plurality of spaced-apart apertures 26 extending through its side wall 21. Preferably, the outer shaft member 20 is constructed from aluminum. However, it will be appreciated that alternate materials can be used for constructing the outer shaft. Similarly, it will be appreciated that shaft member 20 can have a non-cylindrical geometry without departing from the scope of the invention.

Longitudinally extending base member 30 is provided for supporting a plurality of light-emitting diodes (LEDs) 40, or any other suitable known light-emitting sources, and associated electrical conductors 42, 44. Base member 30 is generally defined by a solid semi-cylindrical member having forward and rearward ends, 32 and 34, respectively, and a recessed, or hollowed out, portion defining a planar or substantially flat surface 38 extending between solid semi-cylindrical end portions 35. Preferably, the diameter of the semi-cylindrical end portions 35 is slightly less than the inner diameter of hollow semi-cylindrical member 20, such that base member 30 can be snugly inserted therein. A threaded mechanical fastener 48 is configured for being received through a threaded aperture (not shown) in shaft wall 21 and an aligned threaded aperture 37 extending through semi-cylindrical portion 35 of base member 30 for providing attachment of the outer shaft member 20 to the inner base member 30. It will be apparent to those skilled in the art that myriad alternative means are possible for securing the outer shaft member 20 to the inner base member including, for example, providing mating snap-fit structures, magnetic portions, and permanent welds, to name just a few.

Spaced-apart apertures 36 in substantially flat surface 38 are provided extending completely through base member 30. Preferably, the apertures 36 are sized and shaped for snugly receiving corresponding light-emitting sources in general and light-emitting diodes (LEDs) 40 therein in particular. Significantly, the apertures 36 in base member 30 substantially align with the apertures 26 in outer hollow shaft member 20 such that light emitted from the light source or LEDs is directed through apertures 26 during operation. Although only a single source or LED 40 is depicted positioned in each aperture 36 in the accompanying drawings, it will be appreciated that multiple sources or LEDs can be positioned, for example, in a back-to-back configuration, within each aperture to further enhance the intensity of the emitted light.

Preferably, base member ends 32 and 34 are externally threaded for mating with internally threaded portions (not shown) of corresponding shifter pedal and transmission lever portions of motorcycle 10. In this manner, base member 30 provides a rigid structural linkage between the shifter pedal and transmission portions of the motorcycle for enabling gear shifting. The threaded configuration further enables subtle longitudinal adjustment of the base member depending upon the distance between the shifter pedal and transmission portions being coupled. Base member 30 also provides a structurally sound support for coupled outer shaft member 20.

As will be appreciated by those skilled in the art, that alternative base member end configurations can be employed without departing from the scope of the invention. For example, ends 32 and 34 can be configured for snap fit attachment, direct welding, and any other known means for providing secure coupling to the shifter pedal and gear shifting portions.

Electrical wire pairs 42, 44 or other electrical conductors are provided for transmitting power to the LEDs 40 from a power source 51 (FIG. 8). As will be appreciated by those skilled in the art, power can be provided via coupling to the motorcycle battery or, alternatively, through a separately provided battery or like source. The individual positive and negative wires from each wire pair 42, 44 can be soldered, or otherwise electrically coupled, to corresponding positive and negative leads 41 of each LED 40. In lieu of soldering the wires directly to the leads of each LED, planar surface 38 can be coated with an electrically insulating layer having electrically conductive lines disposed thereon and electrically connected to the respective LED leads. In this manner, the wires 42, 44 could be soldered, or otherwise electrically coupled, at a single location to the conductive lines or leads.

Base member 30 has a slot 39 provided adjacent forward end 32 which cooperates with a corresponding slot 28 adjacent forward end 22 of hollow shaft member 20 to create an opening through which the conductive members 42, 44 extend.

Referring briefly to FIG. 8, an electrical circuit 50 is provided for controlling one or more output characteristics of light-emitting source 40. The exemplary circuit of FIG. 8 includes potentiometers 52, NPN transistors 54, fixed capacitors 56 and fixed resistors 58 for manipulating an electrical current provided by power source 51. The potentiometers 52 in the exemplary circuit 50 provide adjustable flashing of LED sets 53 and 55. Circuits for controlling a variety of light source output characteristics are well known and commercially available.

Referring now to FIGS. 9–12, in an alternate embodiment of the present invention, a rigid substantially hollow cylindrical shaft member 60 has coupling components 72 attached at forward and rearward shaft member ends, 62 and 64, respectively. Preferably, the coupling components 72 each have a solid near end 74 extending into the hollow shaft member 60 and permanently welded to interior surface 63 of shaft wall 61. An opposite distally-extending threaded end 76 is provided configured for mating engagement with corresponding threaded structures (not shown) in shifting pedal and transmission portions of the motorcycle.

An interior space 65 extends between solid portions 74 and is further defined by interior surface 63 of shaft wall 61. Access to the interior space 65 is provided through an opening 68 extending through a bottom side of the shaft wall 61. Apertures 66 are provided extending through the shaft wall 61 along the topside of the shaft member 60. Preferably, the apertures are shaped and sized for having corresponding light-emitting diodes (LEDs) 40 received therethrough. Specifically, a plurality of LEDs electrically coupled to electrical wires or connectors 42 are disposed within interior space 65 and extend outwardly through the apertures 66. The wires 42 are electrically attached to LED conductive leads 41. Preferably, an electrically insulating member 46 is interposed between inner shaft surface 63 and the electrically conductive structures 41, 42 to prevent electrical shorting.

As will be apparent to those skilled in the art, the openings or apertures 26 and 66 are not limited to the circular apertures illustrated in the accompanying drawing figures. The openings can have any geometric or ornamental configuration. Furthermore, in lieu of geometric openings, shaft wall cutout portions can be provided to depict ornamental configurations, decorative lettering and the like. Furthermore, in lieu of providing LEDs or other light devices configured for being received through individual apertures, a flexible neon light-emitting tubing or any other such structure can be incorporated within interior space of the illuminated shifter linkage apparatus of the invention.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An illuminated motorcycle shifter linkage apparatus disposed between a shifter pedal and a transmission of a motorcycle, said apparatus, comprising:

a rigid shaft member generally defined by a longitudinally extending shaft wall terminating at opposite shaft ends, the shaft wall defining an interior space; and at least one light-emitting source disposed within the interior space of said shaft; and said shaft wall having at least one opening provided therein for enabling light emitted by said light-emitting source to pass therethrough.

2. An illuminated motorcycle shifter linkage apparatus as recited in claim 1, wherein said opposite shaft ends are provided for coupling to the corresponding shifter pedal and transmission of said motorcycle.

3. An illuminated motorcycle shifter linkage apparatus as recited in claim 2, further comprising a pair of coupling members each having a proximal end attached to said shaft member and an opposite distally extending end configured for being coupled to one of said shifter pedal and transmission of said motorcycle.

4. An illuminated motorcycle shifter linkage apparatus as recited in claim 3, wherein the distally extending ends of said coupling members are formed for mating with corresponding internal portions of said shifter and transmission portions.

5. An illuminated motorcycle shifter linkage apparatus as recited in claim 3, wherein opposite end portions of said shaft wall are internally threaded and the ends of said coupling members are externally threaded for mating therewith.

6. An illuminated motorcycle shifter linkage apparatus as recited in claim 1, wherein said shaft wall has a plurality of apertures provided therethrough and said at least one light-emitting source further comprises a corresponding plurality of light-emitting elements sized and shaped for mounting therein.

7. An illuminated motorcycle shifter linkage apparatus as recited in claim 1, wherein said at least one light-emitting source is selected from the group including: tubular neon light and light-emitting diodes.

8. An illuminated motorcycle shifter linkage apparatus as recited in claim 1, further comprising at least one additional shaft wall opening sized and shaped for facilitating insertion of said at least one light-emitting source into said interior space.

9. An illuminated motorcycle shifter linkage apparatus as recited in claim 1, further comprising a power source electrically connected to said at least one light-emitting source.

10. An illuminated motorcycle shifter linkage apparatus as recited in claim 9, further comprising an electronic circuit electrically coupling said power source and said at least one light-emitting source for controlling one or more output characteristics of said light-emitting source.

11. An illuminated motorcycle shifter linkage apparatus disposed between a shifter pedal and a transmission of a motorcycle, said apparatus comprising:

a shaft member generally defined by an open ended longitudinally extending shaft wall having inner and outer wall surfaces and at least one opening extending therethrough, the inner shaft wall surface defining an interior shaft space;

a rigid longitudinally extending base member extending through said interior shaft space; and at least one light-emitting source supported by said base member and positioned for facilitating passage of said emitted light through said at least one shaft wall opening.

12. An illuminated motorcycle shifter linkage apparatus as recited in claim 11, wherein opposite ends of said base member are configured for coupling to corresponding shifter pedal and transmission of said motorcycle.

13. An illuminated motorcycle shifter linkage apparatus as recited in claim 12, wherein said at least one opening extending through said shaft wall further comprises a plurality of spaced-apart apertures.

14. An illuminated motorcycle shifter linkage apparatus as recited in claim 13, wherein said base member has a plurality of spaced-apart apertures extending therethrough and corresponding to said base member shaft wall apertures, and said at least one light source further comprises a plurality of light-emitting elements disposed within said base member apertures.

15. An illuminated motorcycle shifter linkage apparatus as recited in claim 12, wherein said base member apertures and said shaft wall apertures are substantially aligned to facilitate transmission of light emitted from said light-emitting elements through said shaft wall apertures.

16. An illuminated motorcycle shifter linkage apparatus as recited in claim 11, further comprising means for securing said shaft member and said base member to each other.

17. An illuminated motorcycle shifter linkage apparatus as recited in claim 11, further comprising an electrically insulating layer interposed between said base member and the inner surface of said shaft wall.

18. An illuminated motorcycle shifter linkage apparatus as recited in claim 11, further comprising a power source electrically connected to said at least one light-emitting source.

19. An illuminated motorcycle shifter linkage apparatus as recited in claim 18, further comprising an electronic circuit electrically coupling said power source and said at least one light-emitting source for controlling one or more output characteristics of said light-emitting source.

20. An illuminated motorcycle shifter linkage apparatus, comprising:
   a shaft member generally defined by an open ended substantially hollow longitudinally extending shaft wall having inner and outer wall surfaces and a plurality of spaced-apart apertures extending therethrough, the inner shaft wall surface defining an interior shaft space;
   a rigid longitudinally extending base member extending through said interior shaft space, the base member having a plurality of apertures substantially aligned with the apertures in said base member shaft wall, and opposite ends of the base member configured for coupling to corresponding shifter pedal and transmission of said motorcycle;
   at least one light-emitting element disposed within said base member apertures;
   means for securing said shaft member and said base member to each other;
   a power source electrically connected to said at least one light-emitting element; and
   an electronic circuit electrically coupling said power source and said at least one light-emitting element.

21. A motorcycle, comprising:
   a shifter pedal;
   a transmission; and
   an illuminated shifter linkage apparatus linked at opposite ends to said shifter pedal and said transmission.

22. A motorcycle as recited in claim 21, wherein said illuminated shifter linkage apparatus further comprises:
   a substantially hollow linkage shaft member having a shaft wall defining an interior shaft space, and at least one aperture passing through said shaft wall;
   a light-emitting source disposed within said shaft interior space; and
   a power source electrically coupled to said light-emitting source.

23. A motorcycle as recited in claim 22, the motorcycle further comprising:
   an electrical circuit coupled to said power source and said light-emitting source; and
   a control panel having control means coupled to said electrical circuit for controlling output characteristics of said light-emitting source.

* * * * *